(12) United States Patent
Doremus et al.

(10) Patent No.: US 6,193,039 B1
(45) Date of Patent: Feb. 27, 2001

(54) FRICTION CLUTCH WITH FRICTION LINING WEAR TAKE-UP DEVICE

(75) Inventors: Oliver Doremus, Izel Lez Hameau; Dominique Despres, Amiens; Jean-Luc Travers, Andechy, all of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/242,320

(22) PCT Filed: Jun. 17, 1998

(86) PCT No.: PCT/FR98/01273

§ 371 Date: Aug. 5, 1999

§ 102(e) Date: Aug. 5, 1999

(87) PCT Pub. No.: WO98/58186

PCT Pub. Date: Dec. 23, 1998

(30) Foreign Application Priority Data

Jun. 17, 1997 (FR) .................................................. 97 07482
Dec. 24, 1997 (FR) .................................................. 97 16487

(51) Int. Cl.[7] ................................................. F16D 13/75
(52) U.S. Cl. ................................... 192/70.25; 192/30 W; 192/111 A
(58) Field of Search ........................... 192/70.25, 111 A, 192/109 R, 30 W (56) References Cited

U.S. PATENT DOCUMENTS

| 5,181,593 | | 1/1993 | Flotow et al. | |
|---|---|---|---|---|
| 5,531,308 | * | 7/1996 | Gochenour et al. | 192/70.25 |
| 5,540,313 | * | 7/1996 | Weidinger | 192/70.25 |
| 5,641,048 | * | 6/1997 | Von Gaisberg | 192/70.25 |
| 5,645,154 | * | 7/1997 | Weidinger | 192/70.25 |
| 5,960,926 | * | 10/1999 | Schubert | 192/111 A |

FOREIGN PATENT DOCUMENTS

| 19617092 | 11/1996 | (DE) . |
|---|---|---|
| 2606477 | 5/1988 | (FR) . |
| 2739158 | 5/1997 | (FR) . |
| 2294301 | 4/1996 | (GB) . |
| 2294983 | 5/1996 | (GB) . |

OTHER PUBLICATIONS

International Search Report for PCT/FR98/01273

* cited by examiner

Primary Examiner—Rodney H. Bonck
(74) Attorney, Agent, or Firm—Liniak, Berenato, Longacre & White (57) ABSTRACT

The invention concerns a friction clutch in particular for motor vehicle, comprising a reaction plate (202), a friction disk (200), bearing friction linings (201), a pressure plate (1), a cover (2), clutch means (3) controlled by disengaging means and operating between the cover (2) and the pressure plate (1) through support means (14), a wear take-up device, one of the intermediate support means being capable of being axially offset and the wear take-up device comprising compensating means, actuated by actuating means, to produce said offsetting, controlled by triggering means combined with detecting means, sensitive to wear, operating on one at least of the actuating means, compensating means and triggering means: the wear take-up device also comprises means, called disconnecting means, making it inoperative before the linings are completely worn, adapted to act on the compensating means or the actuating means or the triggering means or the detecting means.

26 Claims, 8 Drawing Sheets

FRICTION CLUTCH WITH FRICTION LINING WEAR TAKE-UP DEVICE

The present invention concerns a friction clutch, in particular for motor vehicles, and more particularly a clutch equipped with a device for taking up wear of the friction linings in particular, referred to hereinafter as the wear take-up device.

A conventional friction clutch generally includes a reaction plate, which may be in two parts to form a damper flywheel or a flexible flywheel, constrained to rotate with a first shaft, usually a driving shaft such as the crankshaft of the internal combustion engine, its outside periphery supporting a cover to which at least one pressure plate is attached.

The pressure plate is constrained to rotate with the cover and the reaction plate but can be moved axially by axially acting clutch engaging spring means operated by clutch release means; the clutch engaging means can be coil springs or one or two Belleville washers disposed in series or in parallel acted on by clutch release levers forming the clutch release means; the clutch engaging and clutch releasing means generally form part of the same component, for example a metal diaphragm bearing on the cover; the diaphragm can be disposed in series or in parallel with a Belleville washer to assist the clutch release force, as described in document FR-A-2 753 758, for example.

A friction disk carrying friction linings at its outside periphery and constrained to rotate with a shaft, usually a driven shaft such as the input shaft of the gearbox, is disposed between the pressure plate and the reaction plate and is gripped between them when the clutch is engaged. The clutch engaging means cause axial displacement of the pressure plate when they are operated by a clutch release thrust bearing through the intermediary of the clutch release means.

During the service life of a clutch of the above kind the friction linings and the materials against which they bear (pressure plate and reaction plate) wear, which varies the position of the pressure plate and those of the axially acting clutch engaging means and the clutch release thrust bearing; this varies the force with which the friction disk is clamped between the pressure and reaction plates because the working conditions of the clutch release means are modified and it also affects the force needed to release the clutch. Providing a clutch of the above kind with a wear take-up device eliminates these drawbacks, the clutch engaging means and the clutch release thrust bearing, usually bearing at all times against the clutch release means, occupying the same position when the clutch is engaged.

A friction clutch equipped with a wear take-up device is adapted so that one of the supports of the clutch engaging means, whether this is the support joined directly or indirectly to the cover or the support joined directly or indirectly to the pressure plate, can be offset axially, compensator means being provided to bring about this offsetting, in association with actuator means for actuating said compensator means and trigger means selectively authorizing operation of the actuator means. A wear take-up device is controlled by detector means responsive to wear of the linings, directly or indirectly, for example responsive to the position of at least one of the components of the clutch affected by such wear, said detector means operating on said compensator means, said actuator means or said trigger means.

Various types of wear take-up device are known per se.

For example, document FR-A-2 753 503 describes a clutch in which the wear take-up device includes ramp means disposed circumferentially, constituting the compensator means, disposed axially between the offsettable support and the pressure plate and adapted to be rotated by teeth at their periphery which cooperate with a tangential lead screw, means for rotating the lead screw being rendered operational by wear of the friction linings, and non-return means preventing the lead screw turning in the direction opposite to that in which it is rotated by the rotation drive means, when operational, the lead screw, the non-return means and the rotation drive means of the lead screw being carried by a support attached to the cover and the axially acting clutch engaging spring means comprising a diaphragm. The lead screw rotation drive means are actuated by the diaphragm; the ramp means comprise a ring including the offsettable support of the diaphragm and circumferentially distributed inclined ramps and the pressure plate has studs or ramps adapted to cooperate with the ramps of the ramp means; the lead screw is adapted to be slid along its axis by take-up spring means constituting the actuator means and when it is displaced along its axis it drives circumferential rotation of said ramp means. The lead screw rotation drive means comprise a ratchet wheel attached to the lead screw and the non-return means comprise a pawl that cooperates with the ratchet wheel. Here the detector means comprise a tongue operated by the diaphragm and adapted to cooperate with the ratchet wheel, its travel increasing with the wear until, when the clutch is engaged, it can push a tooth of the ratchet wheel and turn the screw, compressing the take-up spring means; the trigger means are represented by a reduction of the load on the supporting bead, on releasing the clutch, the take-up spring means allowing the inclined ramps to move and therefore axial offsetting of the plate support when its spring force is sufficient to overcome the friction forces.

Accordingly the detector means, here the tongue operated by the diaphragm, operate via the ratchet wheel on the actuator means, here the take-up spring means, producing an actuation force: triggering occurs on a subsequent clutch release operation.

In document GB-A-2 294 983 the clutch engaging means comprise a diaphragm and the support that can be offset is also the plate support; the take-up means again comprise ramps; the actuator means comprise a spring operative at all times between ramps and counter-ramps in the direction of increasing axial thickness; again triggering is effected during the clutch release operation by a reduction in the load on the support bead while the pressure plate moves, according to the wear, relative to a pin bearing on the reaction plate, said pin passing with friction through the pressure plate and constituting the detector means. The pin carries an abutment in the form of a lever cooperating with the ramp means; the detector means therefore operate on the compensator means.

In document GB-A-2 294 301 the clutch engaging means also comprise a diaphragm, the compensator means comprise ramps and the actuator means comprise a spring operative at all times between the ramps and the cover; the support that can be offset is the primary support carried by the cover; the clutch is of the push type and triggering is obtained by sinking of the secondary support, facing the primary support on the pressure plate side, and mounted elastically, the maximal clutch release load increasing with the wear, this constituting the detector means which, through sinking, constitute the triggering means. The detector means therefore operate on the triggering means, a clearance appearing between the primary and secondary supports as the secondary support sinks, said clearance being compensated by movement of the primary support by actuator means.

Figure 10:
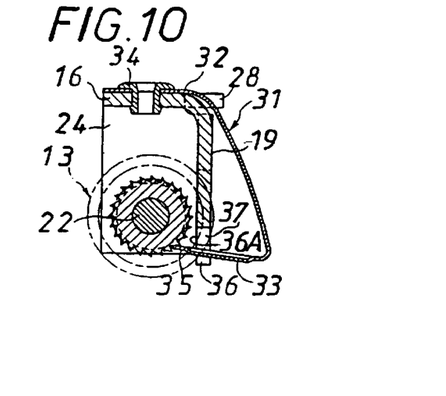

In the FIG. 10 embodiment of document U.S. Pat. No. 5,564,541 the detector means comprise a pin disposed with clearance between the cover and the reaction plate and passing with friction through the pressure plate, the force needed to move the pin relative to the pressure plate being greater than the pressure plate return force, here produced by tangential tongues; the actuator means comprise a spring operative at all times between the pressure plate and the ramps that constitute the take-up means; it is the plate support that can be offset, the clutch device being of the pull type. Here the clutch release travel varies: the completely released position is fixed so that triggering occurs at the end of the clutch release operation, after detection of wear and appearance of a clearance, which is then compensated by the actuator means.

Figure 5:
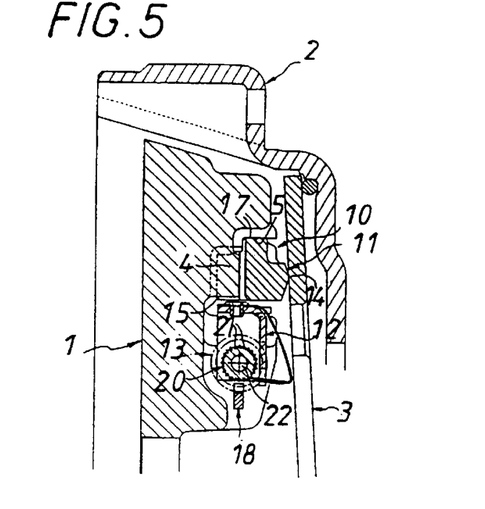

In the FIG. 5 embodiment of document FR-A-2 599 446 the components are similar to those of the previous document except that the compensator means comprise an axial unidirectional freewheel and the actuator means comprise a spring urging the balls against their ramps at all times.

Figure 3:
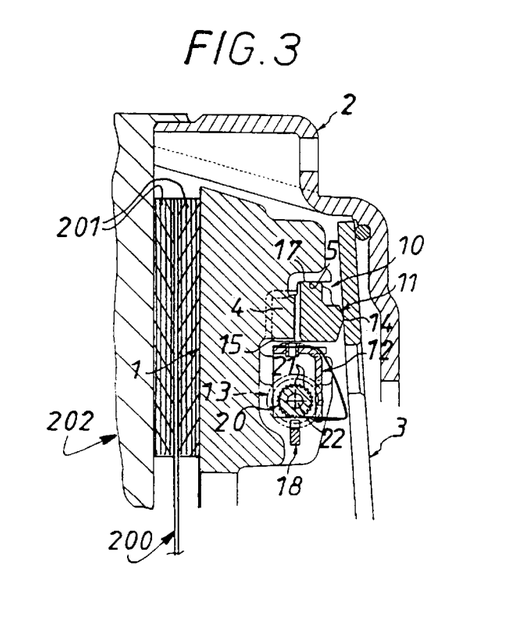
FIG. 3 is a view analogous to FIG. 2 showing the clutch released.

In the FIG. 3 embodiment of document U.S. Pat. No. 5,564,541 the detector means comprise a pin disposed with clearance between the cover and the pressure plate and passing through the cover with friction, the force needed to move the pin relative to the cover being greater than the pressure plate return force, here produced by tangential tongues; the actuator means comprise a spring operative between the cover and a rotary ring which has ramps adapted to cooperate with counter-ramps; it is therefore the cover support that can be offset, the clutch being of the pull type. Triggering occurs at the end of the clutch release operation after detection of wear and appearance of a clearance compensated by the actuator means; as in FIG. 10, the completely disengaged position is fixed, the clutch engaging means including clutch release levers associated with coil springs bearing against the cover.

If a clutch is equipped with a wear take-up device which operates automatically it is beneficial for the user to have an idea of the degree of wear of the friction linings; without this information the user may continue to use the friction disk until the linings are completely worn away, which can lead to serious damage to the friction surfaces of the flywheel and/or the pressure plate, replacing which is a costly operation; this occurs, for example, if the friction linings on the friction disk are retained by rivets which then rub against the pressure plate and damage its friction face.

The invention aims to overcome the above drawbacks.

In accordance with the invention, a friction clutch, in particular for motor vehicles, of the kind including a reaction plate adapted to be constrained to rotate with a driving shaft, a friction disk carrying at its outside periphery friction linings and adapted to be constrained to rotate with a driven shaft, a pressure plate, a cover fixed to the reaction plate, axially acting clutch engaging means which are operated by clutch release means and which are operative between the cover and the pressure plate through the intermediary of bearing means, the pressure plate being constrained to rotate with the cover, able to move axially relative to the cover and operated on by return spring means urging the pressure plate axially towards the cover, said clutch further including a wear take-up device, one of the supports of the clutch engaging means being adapted to be offset axially and the wear take-up device including compensator means actuated by actuator means to bring about such offsetting, said actuator means being operated by trigger means in association with detector means responsive to the wear of the linings and operating on at least one of the actuator means, compensator means and trigger means, is characterized in that the wear take-up device further includes disabling means for disabling it before the linings are totally worn, adapted to operate on one of the components of the group comprising the compensator means, the actuator means, the trigger means and the detector means.

Other features of the invention are defined in the dependent claims at the end of the description.

To explain the invention better, embodiments shown in the accompanying drawings will now be explained by way of purely illustrative and non-limiting example; in the drawings:

FIGS. 8 through 10 show the unitary subassembly comprising the support, the lead screw, the ratchet wheel, the spring, the shaft and the spring member.

In FIGS. 1 to 14 the diaphragm clutch 3, 53 includes a hollow cover 2, 52.

Here the cover is pressed from sheet metal.

The cover has a back and means for fixing it to a reaction plate, which may be divided to form a damper flywheel or a flexible flywheel, as shown for example in document GB-A-2 294 301, which may be referred to for further details.

In the embodiments of FIGS. 1 to 14 the cover fixing means comprise an axially oriented annular skirt extending a radial rim with holes in it for fixing members, such as screws, for fixing the cover 2 to the reaction plate.

Alternatively, the cover 52 is dish-shaped and has a radial rim at its outside periphery forming means for fixing the cover to the reaction plate, said rim having holes in it for fixing members, such as screws, for fixing the cover to the reaction plate.

In the embodiments shown in FIGS. 1 to 10 the clutch is of the pull type and so traction must be applied to the inside end of the fingers of the diaphragm 3 to disengage (release) the clutch. The outside peripheral part of the Belleville washer of the diaphragm bears on the back of the cover, on a ring (no reference number) carried by the outside periphery of the back of the cover, or alternatively on a pressed portion of said back. The inside peripheral part of the Belleville washer is in contact with a tertiary support 14 described hereinafter.

In the embodiment shown in FIGS. 11 to 14 the clutch is of the push type, which means that a clutch release thrust bearing, not shown, must push on the inside end of the fingers of the diaphragm 53 to disengage (release) the clutch. To this end the back of the cover 52 carries a primary support, for example a pressed portion of the back of the cover at its inside periphery, and a secondary support facing the primary support and in the form of heads of columns, a rolled ring carried by columns 58 (FIGS. 11 and 13) or any other means. The inside periphery of the Belleville washer of the diaphragm 53 is mounted so that it can tilt between said primary and secondary supports. The outside periphery of the Belleville washer is in contact with bearing areas 54 described hereinafter and constituting the tertiary support.

Figure 1:
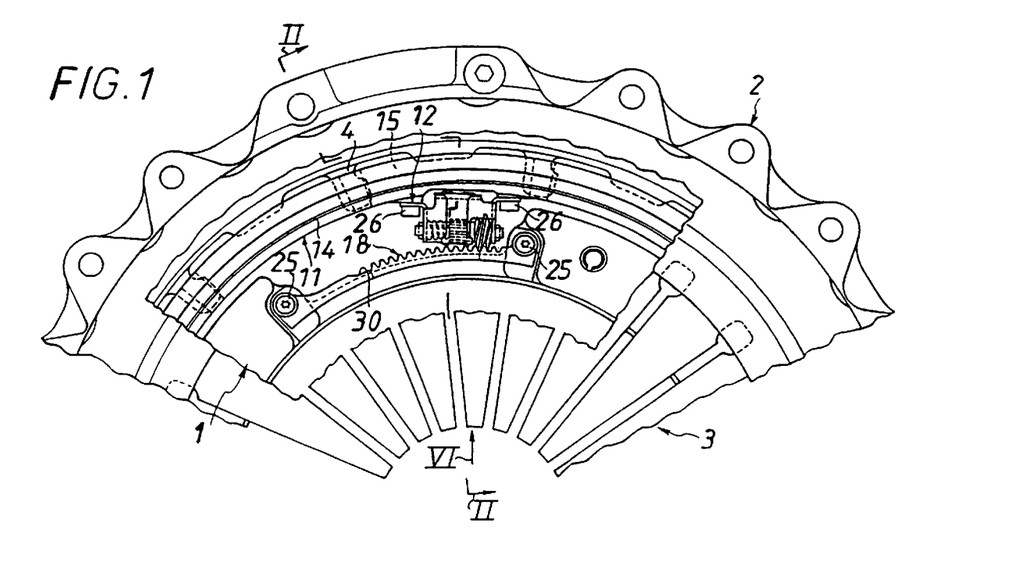
FIG. 1 is a cut-away top view of part of a clutch equipped with a wear take-up device in accordance with the invention, in which the friction linings are new.
Figure 2:
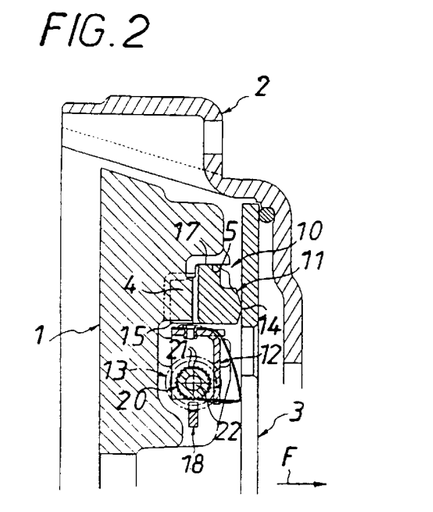
FIG. 2 is a partial sectional view of the clutch taken along the line II—II in FIG. 1.

FIGS. 1 to 10 show a friction clutch mechanism, in particular for a motor vehicle, which comprises a pressure plate 1 adapted to cooperate with a friction disk 200, carrying friction linings 201 at its outside periphery, which in turn cooperates with a reaction plate 202; for simplicity the friction disk 200, the friction linings 201 and the reaction plate 202 are merely sketched in in FIG. 2. The reaction plate 202 is adapted to be constrained to rotate with a driving shaft such as the crankshaft of the internal combustion engine. The friction disk 200 is constrained to rotate with a driven shaft such as the input shaft of the gearbox. To be more precise, the linings 201 are attached to a support rigidly or resiliently coupled to a hub constrained to rotate with the input shaft and forming the output member of the friction disk 200; at the level of the friction linings 201 the support is axially elastic, as described in document GB-A-2 294 301, for example, to constitute a progressive friction disk.

The pressure plate 1 is constrained to rotate with a hollow cover 2 by tangential spring tongues which cannot be seen in the figures and which simultaneously constitute means for biasing the pressure plate 1 towards the cover 2 which here is pressed from sheet metal.

Although it is constrained to rotate with the cover 2, the pressure plate 1 is therefore movable axially relative to the cover 2 by axially acting spring means, here a diaphragm 3 whose outside periphery bears on the cover 2, this clutch being of the pull type and released by operating on the ends of the fingers of the diaphragm 3 in the direction of the arrow F in FIG. 2.

A wear take-up device 10 is provided to maintain the axially acting spring means 3 in a position, when the clutch is engaged, independent of the wear of the friction disk linings and to a lesser degree of the wear of the pressure plate 1 and the reaction plate, the friction faces of which are worn by contact with the disk linings.

The wear take-up device 10 comprises circumferentially disposed ramp means 11; to be more precise the ramp means 11 comprise a ring having circumferentially disposed ramps 15; said ring also has bearing areas 14 consisting in a rounded or alternatively beveled top edge concentric with the axis of the clutch and radially outside the ramps 15.

The side of the pressure plate 1 facing towards the back of the cover 2 incorporates integral and machined studs 4 distributed circumferentially with a spacing that corresponds to the circumferential distance between two successive ramps 15, each stud 4 being adapted to cooperate with a ramp 15.

The ramp means 11 are axially between the diaphragm 3 and the pressure plate 1 and as a result the studs 4 receive the ramps 15 and the diaphragm 3 cooperates with the bearing areas 14 which thereby constitute the support means through which the diaphragm 3 operates on the pressure plate 1.

At the outside periphery the ramp means 11 have a cylindrical wall 17 parallel to the axis of the clutch cooperating with a coaxial cylindrical recess 5 on the face of the pressure plate facing the back of the cover 2, which centers the ramp means 11 relative to the pressure plate 1. The ramp means 11 constitute compensator means in a manner described hereinafter.

The wear take-up device 10 also includes a ratchet wheel 20 with inclined teeth 21 carried by a shaft 22 which also carries a lead screw 13.

Figure 8:
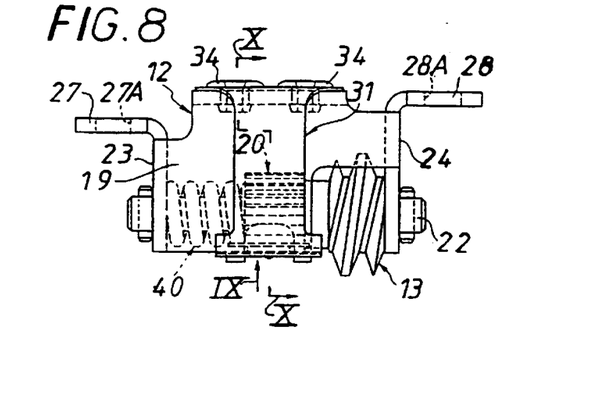
FIG. 8 is a view in the direction of the arrow VIII in FIG. 10 which is a view in section taken along the line X—X in FIG. 8.
Figures 9, 11, 12:
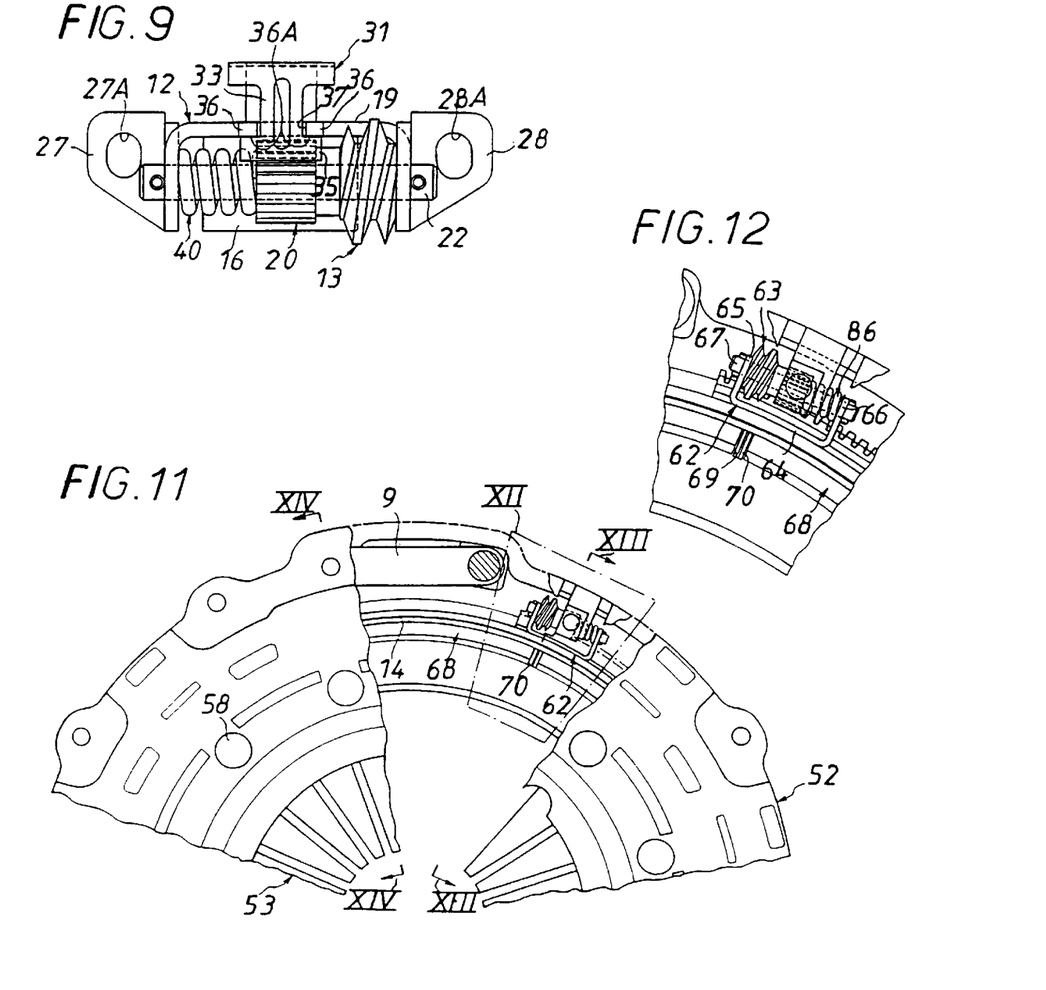
FIG. 9 is a view in the direction of the arrow IX in FIG. 8.
FIG. 11 is a view analogous to FIG. 1 showing a clutch equipped with a variant of the wear take-up device of the invention.
FIG. 12 is a view to a larger scale of the detail XII from FIG. 11.

The shaft 22 of the ratchet wheel 20 is carried by a support 12, seen better in FIGS. 8 to 10, cut from sheet metal and bent to a U-shape having a core 19 and two wings 23, 24 adapted to support the shaft 22; to this end each of the wings has a circular hole in it matching the diameter of the shaft 22.

The wings 23, 24 of the support 12 are extended in the form of L-shape arms 27, 28 extending away from each other perpendicularly to the core 12.

The support 12 is adapted to receive a spring member 31, here a generally C-shape metal member one end 32 of which is used to fix the spring member 31 to a rim 16 on the core 19 of the support 12, here by rivets 34, the rim 16 here being perpendicular to the core 19 and aligned with the arm 28. The T-shape opposite end 33 of the spring member 31 has an actuator tongue 35 at the end.

When the spring member 31 and the ratchet wheel 20 are mounted on the support 12, the actuator tongue 35 cooperates with the root of a tooth of the ratchet wheel 20; a compression coil spring 40 is disposed between the ratchet wheel 20 and the wing 23 of the support 12, being wound around the shaft 22; the lead screw 13 and the ratchet wheel 20 are in one piece; the support 12 fitted with this component, the spring member 31, the spring 40 and the shaft 22 constitutes a subassembly ready for installation.

The coil spring 40 constitutes the take-up spring means, forming actuator means, as described hereinafter.

The thread and the pitch of the lead screw 13 are adapted to suit the teeth 18; the lead screw 13 cooperates with the teeth 18 under conditions described hereinafter.

Figure 6:
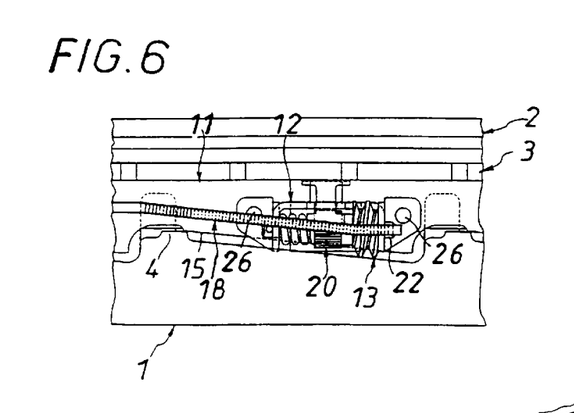
FIG. 6 is a partial view in the direction of the arrow VI in FIG. 1.
Figure 7:
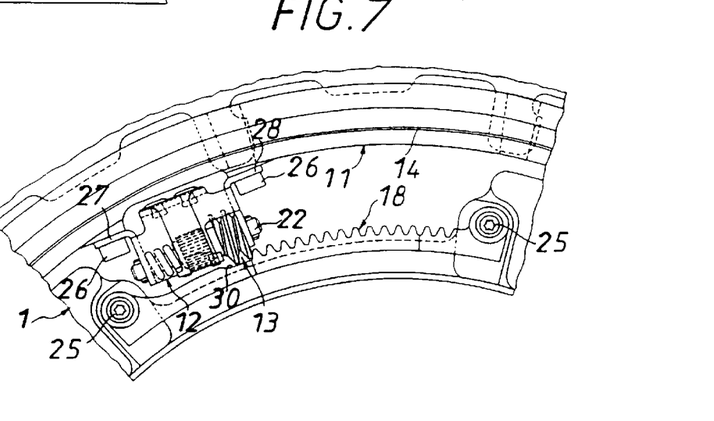
FIG. 7 shows part of FIG. 1 and represents the clutch in the condition in which the wear take-up device is no longer operational, a certain quantity of wear having been taken up.

The teeth 18, seen better in FIGS. 6 and 7, are carried by a sheet metal part bent to a generally flattened Z-shape and fixed at its ends by screws 25 (see FIG. 1) to bosses on the pressure plate 1; those ends are transversely disposed relative to the axis of the clutch and the inclined part joining them is parallel to the ramps 15.

The support 12 carrying the ratchet wheel 20, the lead screw 13 and the coil spring 40, being attached to the ramp means 11, for example by screws 26, the diaphragm 3 moves relative to it during clutch release and engagement; by virtue of this arrangement, when the diaphragm 3 tilts during engagement of the clutch, the actuator tongue 35 is moved and, by cooperating with the teeth 21 on the ratchet wheel 20, turns the ratchet wheel 20 clockwise; on the return, the elasticity of the spring member 31 and the inclination of the teeth 21 cause the actuator tongue 35 to be moved towards the right, as seen in FIGS. 2 to 5, rising up the teeth 21. As the linings 201 wear, the inclination of the diaphragm 3 varies and the actuator tongue 35 associated with the diaphragm 3 therefore constitutes detector means responsive to the degree of wear of the friction linings 201.

The wear take-up device that has just been described operates in the following manner.

FIG. 2 shows the clutch engaged when the friction disk linings are new and are clamped between the reaction plate, not shown, and the pressure plate 1. In this position the actuator tongue 35 has its end at the root of a tooth on the ratchet wheel 20.

When the clutch is released the diaphragm 3 tilts and, as its moves, progressively releases the actuator tongue 35, the end of which follows the inclined ramp consisting of the tooth at whose root it was located in the previous step; the end of the actuator tongue 35 is positioned relative to the teeth 21 on the ratchet wheel 20 so that, during the clutch release travel when the linings are new, it does not skip a tooth (see FIG. 3); this is achieved by the end 33 of the spring member 31 abutting against the support 12, to be more precise against the faces 36A facing towards the ratchet wheel 20 of the flanks 36 of a notch 37 in the core 19 of the support 12 which constitute a control abutment and limit the return travel of the actuator tongue 35 regardless of that of the diaphragm, as shown in FIG. 3, the end 33 being T-shaped with the upright engaged in the notch 37 and the crossbar constituting the actuator tongue 35.

Figure 4:
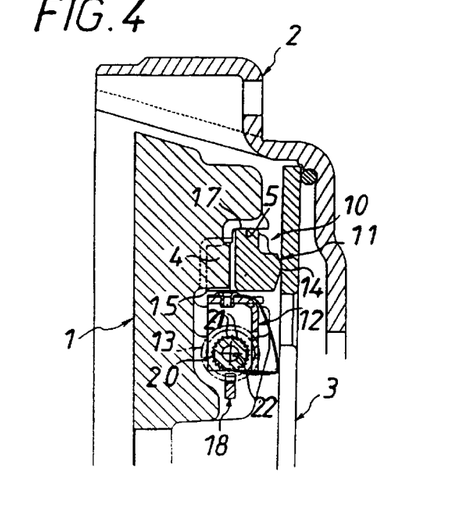
FIGS. 4 and 5 are views analogous to FIGS. 2 and 3, respectively, after the linings have worn.

When the linings wear, the pressure plate 1, on which the diaphragm 3 continues to act in the axial direction, moves towards the reaction plate, which is fixed in the axial direction, like the cover 2; thus the diaphragm 3 moves towards the reaction plate, i.e. towards the open side of the cover 2, entraining the actuator tongue 35 with it; the ratchet wheel 20 turns on its axis in the clockwise direction; FIG. 4 shows the clutch engaged with the lining worn. The rotation of the ratchet wheel 20 causes the lead screw 13 to turn on its axis; the ramp means 11 being immobilized relative to the cover 3 by the diaphragm 3, the lead screw 13 that meshes with the teeth 18 is screwed onto the teeth 18, as it were, slightly compressing the coil spring 40, the direction of the screwthread on the lead screw 13 being such as to achieve this.

During the clutch release operation that follows the wear phase just described, the pressure plate 1 releases the linings on being moved away from them by the tangential tongues 9 which move towards the back of the cover 2 of the pressure plate 1 and the ramp means 11 in contact with the diaphragm 3 through their bearing areas 14 and with the studs 4 on the pressure plate 1 through their ramps 15, the end of the tongue skipping the tooth.

The coil spring 40 urges the lead screw 13 towards the wing 24 of the support 12, which it escaped from during the wear phase, in the direction from right to left as seen in FIGS. 2 and 3; the diaphragm 3 no longer acting on the ramp means 11, the only force to be overcome to turn the ramp means 11 relative to the pressure plate 1 is the friction force generated by the tangential tongue return force; if the force of the coil spring 40 is sufficient to overcome this force, then the spring 40 bearing on the lead screw 13, here through the intermediary of the ratchet wheel 20, the lead screw 13 bearing on the teeth 18, causes the support 12 and therefore the ramps 15 to turn: on turning on themselves the ramps 15 of the ramp means 11, cooperating with the studs 4 on the pressure plate 1, move the pressure plate 1 away from the back of the cover 2, so increasing the axial distance between the working face of the pressure plate 1 and the bearing areas 14 of the ramp means 11, and so taking up at least part of the movement of the pressure plate 1 due to the wear of the linings. The spring force of the coil spring 40 depending on the amount by which it has been compressed by the lead screw 13 during the wear phases, it can be seen that a plurality of clutch engaging and releasing operations may be necessary before the wear take-up device 10 enters the take-up phase proper, depending on the relative dimensions of the components concerned; for example, they can be such that the take-up phase proper occurs for the first time only after a certain degree of wear; in FIG. 5, which corresponds to the clutch released with worn linings, it is assumed that there is no take-up of wear; it is also assumed that the wear is sufficient for the ratchet wheel 20 to have turned far enough for the actuator tongue 35 to skip a tooth on the return.

It is therefore during the clutch engaging operation that the actuator tongue 35, pushed by the diaphragm 3, turns the ratchet wheel 20 which compresses the spring 40 and, during the next clutch release operation, the ramp means 11, which are not clamped by the diaphragm 3, are turned by the actuator means, here the spring 40 if its force is sufficient, and compensate the movement of the plate due to wear; at the end of the take-up operation the diaphragm 3, the ratchet wheel 20 and the actuator tongue 35 return to their positions shown in FIG. 2.

In accordance with the invention the clutch is equipped with a wear take-up device comprising means for disabling it prior to total wear of the lining.

Here the aforementioned means consist in the fact that the length of the teeth 18 with which the lead screw 13 cooperates prevents the screw taking up wear corresponding to only part of the thickness of the linings, for example 80% of that thickness; a recess 30 at the end of the teeth, visible in FIGS. 1 and 7, advantageously enables the lead screw 13 to be decoupled at this time from the teeth 18. FIG. 1 shows the relative position of the lead screw 13 and the teeth 18 when the linings are new and FIG. 7 shows these positions when the linings are 80% worn, for example.

The lead screw 13 no longer operating in the teeth 18, the clutch behaves like a clutch that is not equipped with any wear take-up device; wear continuing, the position of the diaphragm changes with the wear in the engaged condition of the clutch and its load and the force required to release the clutch therefore increase with the wear; as is well known per se; this warns the user that the 80% wear limit has been passed.

In the variant just described the lead screw 13 and the ratchet wheel 21 are in one piece; the lead screw 13 could of course be a separate part provided with a bore, said bore and the shaft itself being adapted to enable the lead screw to slide along the shaft whilst being constrained to rotate with said shaft.

FIGS. 11 to 14 show a friction clutch mechanism, in particular for motor vehicles, which comprises a pressure plate 51 adapted to cooperate with a friction disk, not shown, carrying friction linings at its outside periphery and which in turn cooperates with a reaction plate. The reaction plate, not shown, is adapted to be constrained to rotate with a driving shaft such as the crankshaft of the internal combustion engine. The friction disk is constrained to rotate with a driven shaft such as the input shaft of the gearbox.

The pressure plate 51 is constrained to rotate with a hollow cover 52 by tangential tongues 9 which are elastic in the axial direction and simultaneously constitute means for biasing the pressure plate 51 towards the cover 52.

Figure 13:
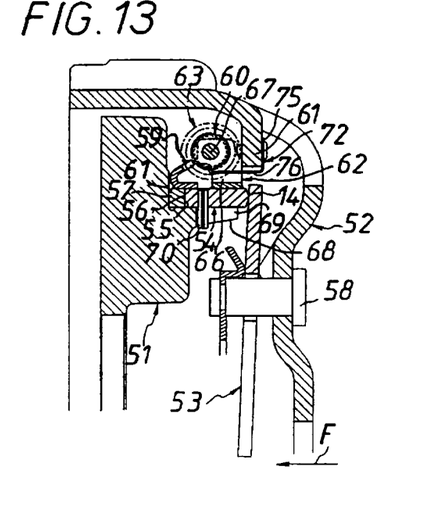
FIG. 13 is a view in section taken along the line XIII—XIII in FIG. 11.

Although the pressure plate 51 is constrained to rotate with the cover 52, it is therefore movable axially relative to the cover 52 by selectively operable axially acting spring means, here a diaphragm 53 articulated to the cover 52 by columns 58 carrying a rolled ring providing a secondary support for the diaphragm 53, the clutch here being of the push type, the clutch release operation being effected by operating on the ends of the fingers of the diaphragm in the direction of the arrow F in FIG. 13.

To maintain the axially acting spring means 53, when the clutch is engaged, in a position independent of the wear of the friction disk linings and to a lesser degree of the wear of the pressure plate 51 and the reaction plate, the friction faces of which wear in contact with the friction linings, a wear take-up device is provided that comprises circumferentially disposed ramp means 54 constituting compensator means; to be more precise, the ramp means 54 comprise a ring having circumferentially disposed ramps 56 on its face facing towards the pressure plate 51; on its opposite face said ring has the bearing area 14 consisting of a rounded or beveled top edge in the shape of a circular arc concentric with the clutch axis. Said bearing area 14 can of course be continuous or discontinuous.

The face of the pressure plate 51 facing towards the back of the cover 52 has a transverse bearing face 61 with which cooperate annular counter-ramp means 57 bearing on its face opposite that which cooperates with the bearing face 61 of the counter-ramps 55 distributed circumferentially at a distance from each other that corresponds to the circumferential distance between two successive ramps 56, counter-ramps 55 each being adapted to cooperate with a ramp 56.

The ramp means 54 are disposed axially between the diaphragm 53 and the counter-ramp means 57 so that the counter-ramps 55 receive the ramps 56 and the diaphragm 53 cooperates with the bearing area 14 which thereby constitutes the bearing means through which the diaphragm 53 operates on the pressure plate 51.

The outside periphery of the counter-ramp means 57 carries teeth 59.

Here the teeth 59 are made of sheet metal cut and bent to shape and welded to the counter-ramp means 57.

The root of the bearing face 61 of the pressure plate 51 is flanked by a circumferential cylindrical cusp 68 the outside periphery of which is concentric with the counter-ramp means 57 and the ramp means 54.

The cusp 68 has an axial notch 69 in which a radial pin 70 carried by the ramp means 54 can move axially: the latter means are thereby prevented from turning relative to the pressure plate 51 and therefore relative to the counter-ramp means 57, although they can move axially.

The wear take-up device further comprises a ratchet wheel 60 with inclined teeth 21 rotating on a shaft 67 which also carries a lead screw 63; the thread and the pitch of the lead screw 63 are adapted to suit the teeth 59 of the counter-ramp means 57; the lead screw 63 cooperates with the teeth 59 under conditions that will be described hereinafter; here the teeth 59 extend radially relative to the shaft 67.

The shaft 67 rotates in a support 62 made of sheet metal cut and bent to a U-shape having a core 64 and two wings 65, 66 adapted to support the shaft 67; the core 64 of the support 62 is fixed, for example welded, to the outside periphery of the ramp means 54, radially above the bearing area 14.

A generally right-angle L-shape spring member 72, which here is made of metal and thinner than the support, comprises two wings 75, 76 of which one wing 75 is for fixing, for example riveting, the spring member 72 to a transverse lug 61 on the cover 52 and the other wing 76 is shaped as an actuator tongue forming the detector means in conjunction with the diaphragm 53, here extending globally parallel to the clutch axis; when the spring member 72 and the ratchet wheel 60 are mounted on the cover 52 and on the ramp means 54, respectively, the actuator tongue 76 cooperate elastically with the root of a tooth on the ratchet wheel 60.

A coil spring 86 constituting the take-up spring means as described hereinafter is disposed around the shaft 67; here the spring 86, forming actuator means, is disposed axially between the ratchet wheel 60 and the wing 66 of the support 62.

The support 62 carrying the ratchet wheel 60, the lead screw 63 and the coil spring 86 being attached to the ramp means 54, it moves relative to the cover 52, and therefore relative to the actuator tongue 76, during clutch release and engagement; by virtue of this feature, when the diaphragm 52 tilts during clutch engagement, the ratchet wheel 60 moves from right to left, as shown in FIG. 11, and by cooperating with the teeth 21 on the ratchet wheel 60 the end of the actuator tongue 76 turns the ratchet wheel 60 anti-clockwise; on releasing the clutch the elasticity of the spring member 72 and the inclination of the teeth 21 are such that the actuator tongue 76 rises up the teeth 21.

The wear take-up device that has just been described operates in the following manner.

Figure 14:
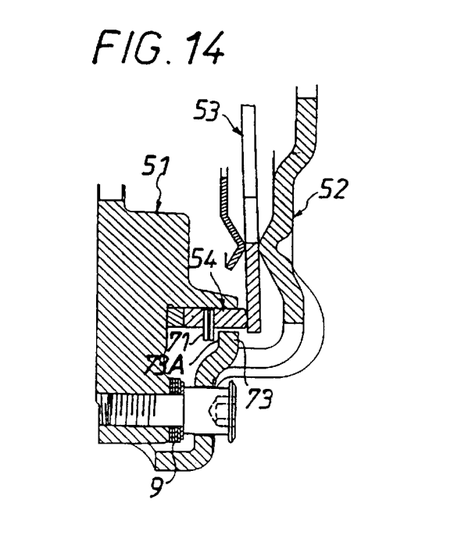
FIG. 14 is a view in section taken along the line XIV—XIV in FIG. 11.

FIGS. 11 and 14 show the clutch engaged, the linings of the friction disk being new and clamped between the reaction plate, not shown, and the pressure plate 51. In this position the end of the actuator tongue 76 is at the root of a tooth on the ratchet wheel 60.

When the clutch is released the ends of the fingers of the diaphragm 53 are urged away from the back of the cover 52, in the direction of the arrow F; the diaphragm 53 tilts on the columns 58; the movement of the outside periphery of the diaphragm 53 progressively releases the pressure plate 51, which entrains the ratchet wheel 60 towards the back of the cover 52, which moves in front of the actuator tongue 76, the end of which follows the inclined ramp consisting of the tooth at whose root it was located in the previous step; the end of the actuator tongue 76 is positioned relative to the teeth 21 of the ratchet wheel 60 so that, during this clutch release travel when the linings are new, it does not skip a tooth; this is achieved by a control abutment 71 abutting against a counter-abutment 73 on the cover 52; here the control abutment 71 is a pin carried by the ramp means 54 and adapted to abut against a lug 73 cut and bent to shape on the cover.

When the linings wear, the pressure plate 51, on which the diaphragm 53 continues to act in the axial direction, moves towards the reaction plate, which is fixed in the axial direction, like the cover 52; all this is known per se; the ratchet wheel 60 therefore moves towards the reaction plate, moving away from the actuator tongue 76 which retains the tooth 21 with which it cooperates at the tooth root; the ratchet wheel 60 therefore turns anticlockwise on its shaft; this rotation of the ratchet wheel 60 causes the lead screw 63 to turn on its shaft; the counter-ramp means 57 being prevented from rotating by the diaphragm 53, the lead screw 63 which meshed with the teeth 59 of the counter-ramp means 57 is screwed onto the teeth 59, as it were, compressing the coil spring 86, the direction of the thread on the lead screw 63 being such that this occurs.

During the clutch release operation that follows the wear phase just described, the pressure plate 51 releases the linings on being moved away from them by the tangential tongues 9 which move towards the back of the cover 52 the pressure plate 51 and the ramp means 54 in contact with the diaphragm 53 through their bearing areas 14 and with the counter-ramps 55 through their ramps 56. The coil spring 86 urges the lead screw 63 towards the wing 65 of the support 62, from which it has moved away during wear phases, i.e. from right to left as shown in FIGS. 9 and 10; the diaphragm 53 no longer loading the ramp means 54, the only force to be overcome to turn the counter-ramp means 55 relative to the pressure plate 51 is the return force of the tangential tongues 9; if the spring force of the coil spring 86 is sufficient to overcome this force, then the spring 86 moves the lead screw 63, which is prevented from rotating on itself by the actuator tongue 76 and which entrains the teeth 59: in turning on themselves, and cooperating with the relatively fixed ramps 56, the counter-ramps 55 move the pressure plate 51 away from the back of the cover 52, so increasing the axial distance between the working face of the pressure plate 51 and the bearing areas 4 of the ramp means 54, and so taking up at least part of the movement of the pressure plate due to wear of the linings. If the wear is sufficient for the ratchet wheel 60 to have turned sufficiently for the actuator tongue 76 to skip a tooth on the return, during the clutch engagement operation the actuator tongue 76 turns the ratchet wheel 60 and the counter-ramp means 57, which are not yet clamped by the diaphragm 53, turn and take up the wear; at the end of the take-up operation the diaphragm 53, the ratchet wheel 60 and the actuator tongue 76 have returned to their position shown in FIG. 11. The load of the coil spring 86 depending on the amount by which it has been compressed by the lead screw 63 during the wear phases, it can be seen that a plurality of clutch engagement and release operations may be needed before the wear take-up device enters the take-up phase proper, depending on the relative dimensions of the parts concerned.

The lead screw 63 and the ratchet wheel 60 being in one piece, as can be seen, the support 62 equipped with that piece, the spring 86, the shaft 67 and the ramp means 54 constitute a subassembly ready to be installed.

In the two examples just described the warning to the user results from a change in the force required to release the clutch and/or in the position of the clutch release thrust bearing; this warning can also be sensed if the clutch includes a Belleville washer to assist clutch release, as described in document FR-A-2 753 758, for example.

Other warning means can be provided to indicate that the wear take-up device has been disabled.

For example, a change in the position of the clutch engaging means such as the diaphragm can be detected.

Alternately a change in the position of the clutch release means such as the diaphragm fingers or a change in the position of the clutch release thrust bearing can be detected.

Clearly the invention applies regardless of the clutch type (pull or push) and the type of wear take-up device, which could for example be of the kind described in document FR-A-2 753 503 in which the lead screw and the lead screw drive means are carried by a support attached to the cover of the clutch or a wear take-up device with no rack and lead screw like that described in document FR-A-2 712 051 or document FR-A-2 726 872.

Diverse variants of the disabling means can be adopted when the compensator means of the wear take-up device comprise ramp means adapted to cooperate with counter-ramp means.

Figure 15:
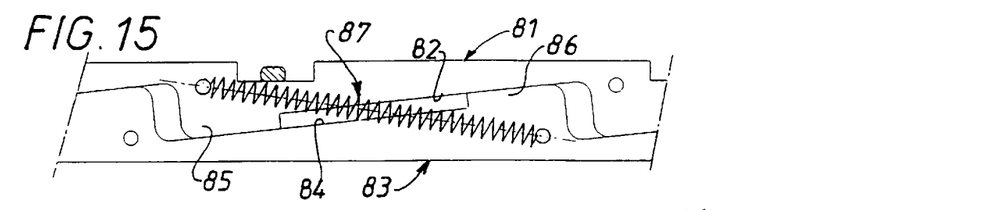
FIG. 15 is a partial view showing a variant of the means for disabling the compensator means, the latter being in the form of ramps.
Figure 16:
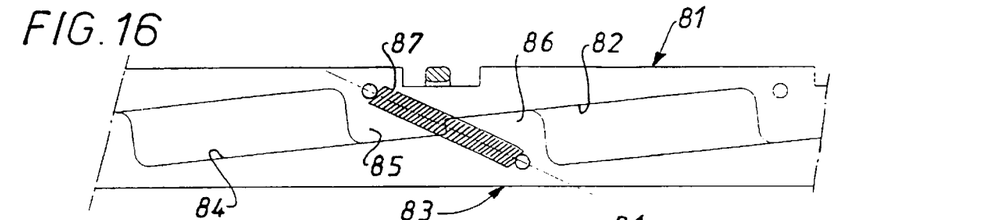
FIG. 16 shows the disabling means from FIG. 15 in an operational position.

In FIGS. 15 and 16 the ramp means 81 include ramps 82 having a heel-piece 85 adapted to cooperate with the ramps 84 of counter-ramp means 83 which have a heel-piece 86 adapted to cooperate with the ramps 82 of the ramp means 81; the ramp means 81 and the counter-ramp means 83 are conventionally spring-loaded for circumferential relative movement by a coil spring 87 constituting the actuator means of the wear take-up device, in the direction of increasing axial thickness of the combination of the ramp means and the counter-ramp means; the heel-pieces 85 and 86 are at a circumferential distance from each other, when the linings are new (FIG. 15), that corresponds to the worn thicknesses of the linings to be compensated; when this distance is absorbed by the take-up device, the heel-pieces 85 and 86 abut against each other (FIG. 16) and at this time the ramp means 81 cannot move relative to the counter-ramp means 83: the wear take-up device is disabled and the clutch behaves in the conventional way from the wear point of view.

Figure 17:
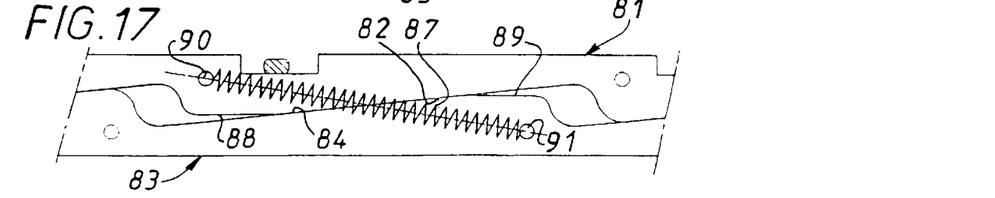
FIG. 17 is analogous to FIG. 15 and shows another variant of the disabling means.
Figure 18:
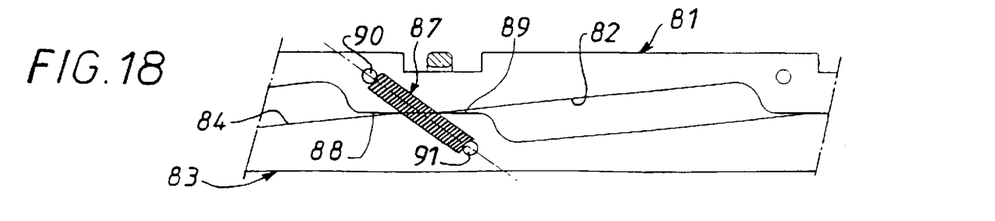
FIG. 18 shows the disabling means from FIG. 17 in an operational position.

In the embodiment shown in FIGS. 17 and 18 the disabling means comprise transverse flats 88, 89 that extend the ramps 82, 84 of the ramp means 81 and the counter-ramp means 83; the flats 88, 89 are at a circumferential distance from each other, in the initial state with new linings (FIG. 17), which corresponds to the worn thickness of the linings to be compensated; when this distance has been absorbed by the take-up device, the transverse flats 88, 89 cooperate (FIG. 18) so that further relative rotation of the ramp means 81 and the counter-ramp means 83 has no effect on their axial thickness, which remains constant: the wear take-up device is disabled and the clutch behaves conventionally from the wear point of view.

The spring 87 forming actuator means spring-loading relative rotation of the ramp means 81 and counter-ramp means 83 in the direction that moves them apart axially is coupled to said means at coupling points 90, 91 in line with the transverse flats 88, 89; by virtue of this arrangement, when the transverse flats 88, 89 cooperate and the wear take-up device is disabled the spring 87 applies only a weak relative rotation torque to the ramp means 81 and the counter-ramp means 83.

Figure 19:
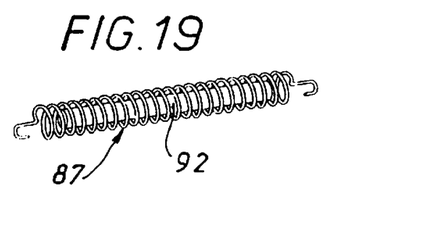
FIG. 19 shows another variant of the disabling means adapted to operate on the actuator means, which consist of a coil spring.

In the FIG. 19 variant, in which the ramp means and the counter-ramp means are not shown, the spring 87 which spring-loads them to rotate in the direction in which they move axially away from each other is a coil spring inside which is a rod 92 that is shorter than the spring 87 in its initial expanded state with new linings; when this difference in length, which corresponds to the worn thickness of the linings to be compensated, has been absorbed, the ends of the rod 92 come into contact with the end turns of the spring 87, which are advantageously closed, or with the coupling points of the spring 87, so that the spring is bypassed, the ramp means and the counter-ramp means then abutting with each other through the intermediary of said rod 92 which therefore constitutes the means for disabling the wear take-up device.

Figure 20:
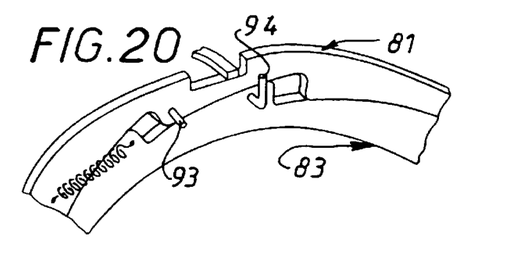
FIG. 20 is a partial perspective view showing a further variant of the disabling means adapted to operate on the compensator means, which comprise ramps.

In the FIG. 20 variant the disabling means comprise an abutment 93 carried by the ramp means 81 constituting the compensator means adapted to cooperate with a counter-abutment limiting their rotational displacement; here the counter-abutment 94 is carried by the counter-ramp means 83; here the abutment 93 and the counter-abutment 94 are disposed laterally relative to said means, the abutment 93 extending axially and the counter-abutment 94 having a portion extending radially with which the abutment 93 is adapted to cooperate.

FIGS. 21 to 24 show part of a clutch of the type described in document GB-A-2 294 983 which may be referred to for more details; here the clutch engaging means comprise a diaphragm articulated to the cover, the support that can be offset being the pressure plate support and the clutch being of the push type; the detector means 102 comprise a pin 103 passing through the pressure plate 101 with friction and carrying an arm 104 cooperating with the ramp means 81 to limit rotation thereof on each take-up operation, the counter-ramp means 83 being attached axially and circumferentially to the pressure plate 101.

Figure 21:
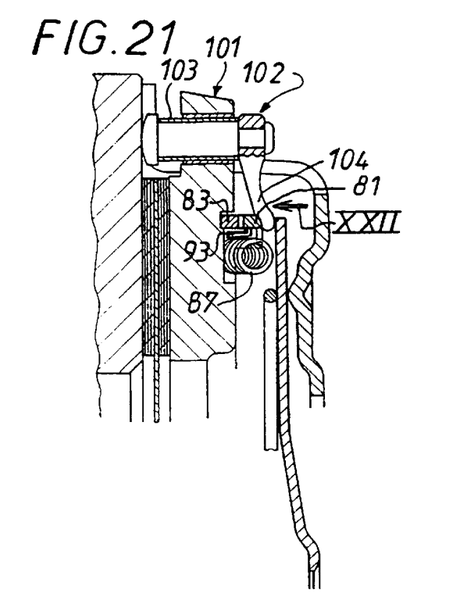
FIG. 21 is a partial view in section of a variant clutch equipped with a wear take-up device comprising a further variant of the disabling means adapted to operate on the ramp means forming the compensator means.
Figure 22:
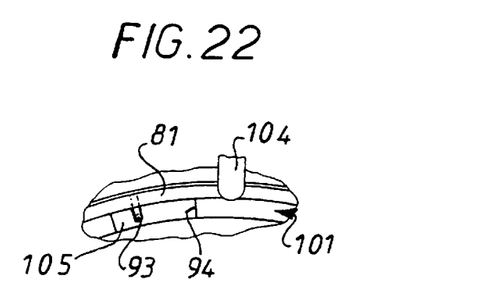
FIG. 22 is a partial view in the direction of the arrow XXII in FIG. 21.
Figure 23:
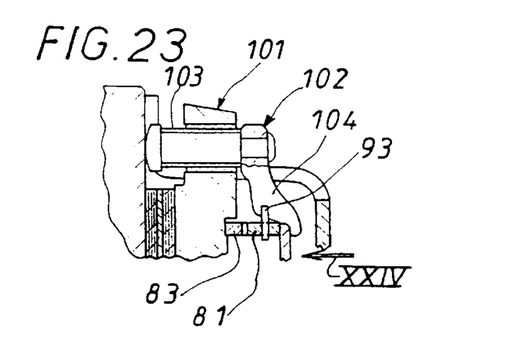
FIG. 23 is a partial view analogous to FIG. 21 showing a further variant of the disabling means.
Figure 24:
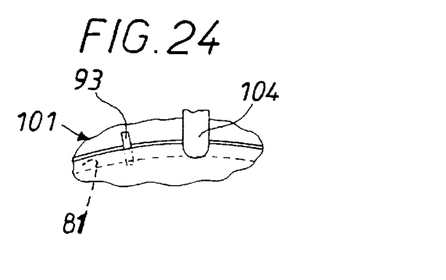
FIG. 24 is a partial view in the direction of the arrow XXIV in FIG. 23.

In accordance with the invention, the ramp means 81 carry an abutment 93; in FIGS. 21, 22 the counter-abutment 94 with which the abutment 93 is adapted to cooperate is the pressure plate 101 itself, by virtue of a recess 105 that it incorporates; in FIGS. 23, 24 the counter-abutment is a member attached to the pressure plate 101, here the arm 104.

Figure 25:
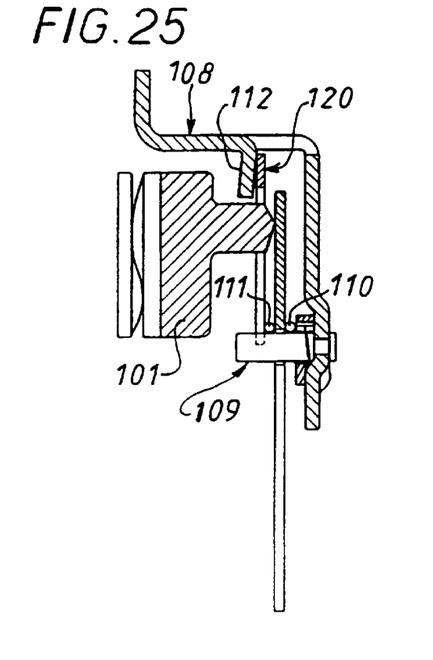
FIGS. 25 and 26 are partial views in section of another variant clutch equipped with a wear take-up device including a further variant of the disabling means adapted to operate on the triggering means which also constitute the detector means, FIG. 25 showing the clutch engaged with new friction linings and FIG. 26 showing the clutch engaged with the disabling means operational.
Figure 26:
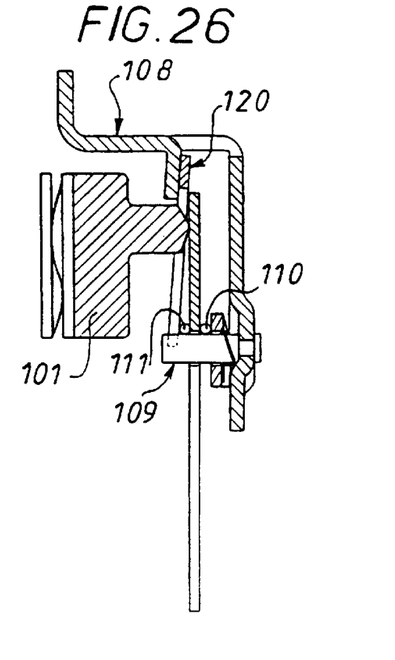
Figure 27:
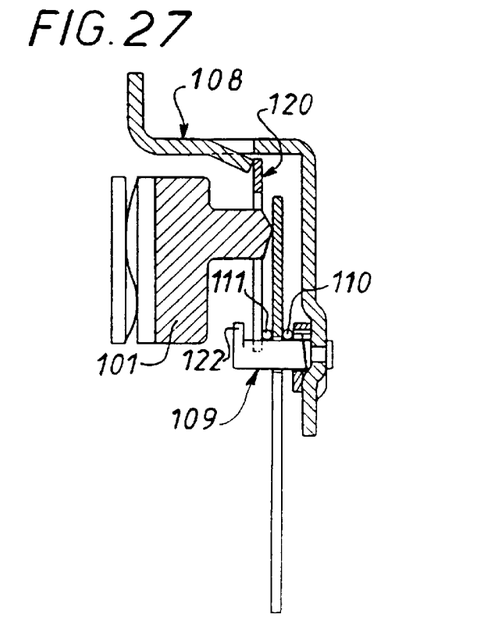
FIG. 27 is analogous to FIG. 25 and shows another variant of the disabling means.

FIGS. 25 to 27 show part of a clutch described in document GB-A-2 294 301, FIGS. 15 to 17, which may be referred to for more details; here the clutch engaging means comprise a diaphragm articulated to the cover, the clutch being of the push type; here the articulation comprises a primary support 110 on the cover side and a secondary support 111 on the same side as the pressure plate 101, facing the primary support 110, the primary and secondary supports 110, 111 being carried by columns 109 distributed circumferentially and fastened to the cover 108; here the support that can be offset is the primary support 110 and triggering is obtained by sinking of the secondary support 111 on which bear triggering spring means 120 also bearing on the cover 108.

In accordance with the invention, the wear take-up device is disabled by limiting the sinking travel of the trigger spring means 120.

In FIGS. 25 and 26 the trigger spring means 120, here in the form of a diaphragm, also form detector means and bear on the cover 108 through the intermediary of one or more lugs 112 that are part of the cylindrical skirt of the cover 108 and extend radially inside the skirt; as a result of successive take-up operations, the supports 110 and 111 are moved towards the reaction plate and the trigger spring means 120 are progressively inclined; the lug 112 is inclined so that its angle of inclination corresponds to that of the trigger spring means 120 to be limited, the wear take-up device being disabled (FIG. 26); the spring characteristics of the trigger spring means 120 are chosen so that the stiffness of said means increases very rapidly with their inclination so that in the FIG. 26 position they constitute a firm support for the secondary support 111 that cannot sink.

In FIG. 27 the travel of the trigger spring means 120 is limited by an abutment 122 carried by at least one column 122 in line with the primary and secondary supports 110, 111 on the same side as the pressure plate 101.

FIGS. 28 to 35 show part of a clutch of the type described in document U.S. Pat. No. 5,564,541, FIGS. 1 to 9, which may be referred to for more details.

Here the clutch is of the pull type; the clutch engaging means comprise clutch release levers 150 associated with coil springs 151 bearing on the cover 108 and on a clutch release actuator member 154 to which the inside ends of the levers 150 are coupled.

The outside ends of the levers 150 are articulated to a ring 188 that carries ramp means 152 which cooperate with counter-ramp means 153: it is therefore the cover side support 108 that can be offset; the ring 188 is coupled to the cover by tangential spring tongues 116 urging the ramp means 152 and the counter-ramp means 153 into axial bearing engagement with each other.

Figure 28:
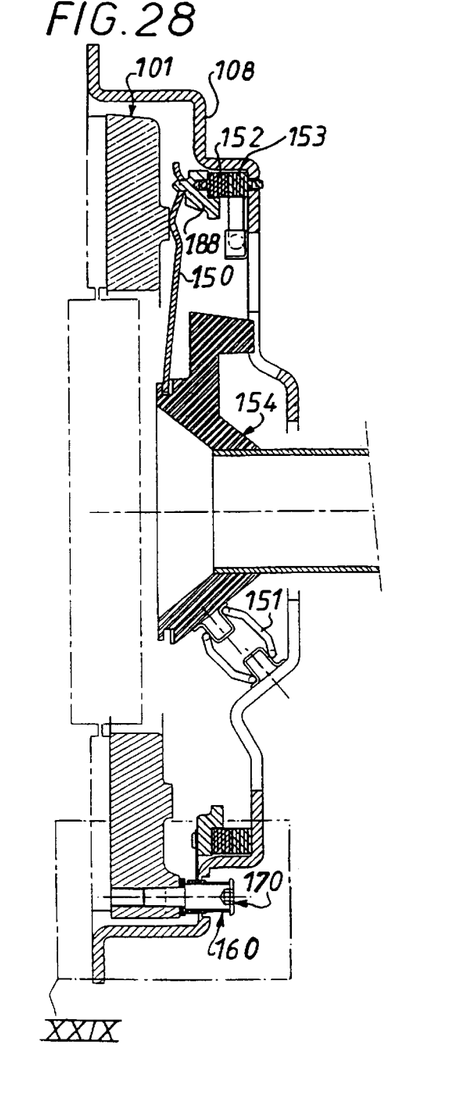
FIG. 28 is a partial view in section of another variant clutch of the pull type equipped with a wear take-up device comprising a further variant of the disabling means adapted to operate on the detector means, which consist of a pin, the clutch being shown released and with new friction linings.
Figure 29:
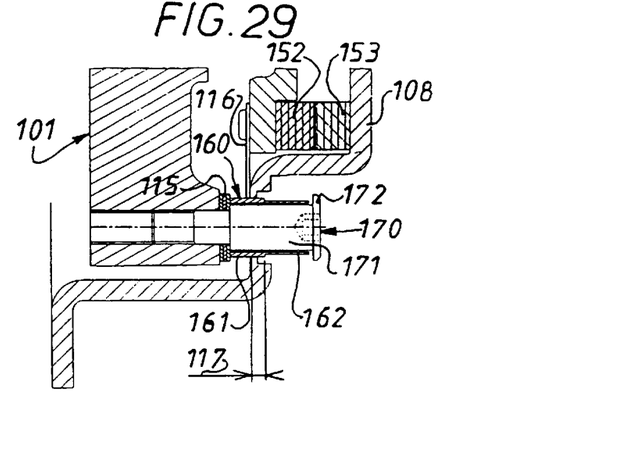
FIG. 29 is a view to a larger scale of the detail XXIX in FIG. 28.

Here, referring to FIGS. 28 to 31, the detector means comprise a pin 160, seen better in FIG. 29, mounted with clearance around the cylindrical body 171 of a shouldered screw 170 having a head 172 and screwed into the pressure plate 101 to attach thereto conventional tangential return tongues 116.

The pin 160 passes through the cover 108 with friction; to be more precise it has on its outside cylindrical face a rubbing bearing surface 161 through which it comes into rubbing cooperation with the cover 108, which rubbing is such that the force needed to slide the pin 160 relative to the cover 108 is greater than the axial return force applied to the pressure plate 101 by the return tongues 115 but less than the axial force of the clutch engaging means 151.

The rubbing bearing surface 161 is followed by a cylindrical tail-piece 162 having a smaller diameter; accordingly the axial length of the rubbing bearing surface 161 is less than that of the pin 160 which comprises the length of the bearing surface 161 and that of the tailpiece 162; the length of the pin 160 is slightly less than the distance between the facing faces of the tongues 115 and of the head 172 of the screw 170 so that axial clearance is provided to enable the pressure plate 101 to be raised a distance equal to said axial clearance.

Figure 30:
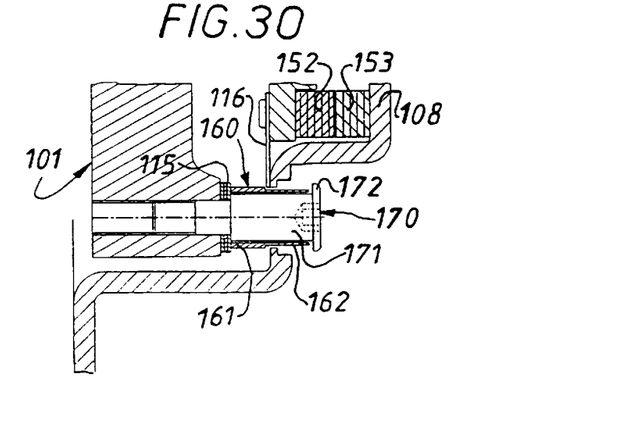
FIGS. 30 and 31 are analogous to FIG. 29, the disabling means being shown in their operational position, the linings being worn and the clutch being engaged in FIG. 30 and released in FIG. 31.
Figure 31:
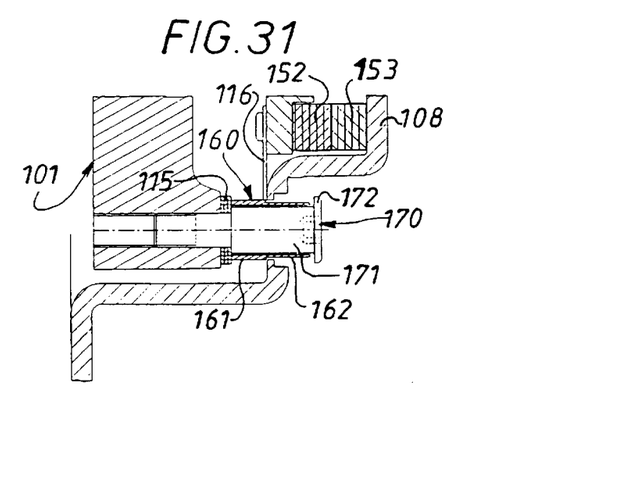

By design, the lengths referred to hereinabove are such that, when the clutch is disengaged and when the linings are new, FIG. 29, a particular length 117 marked in the figure is defined: it corresponds to the worn thickness of the linings to be compensated; when the length 117 has been absorbed, and FIG. 31 shows the moment at which this has just occurred, the pin 160 is free relative to the cover 108, in the clutch released position; the wear take-up device is then disabled and the clutch operates as usual, FIG. 30.

FIGS. 32 to 35 show a variant of the disabling means applicable to a clutch like that shown in FIG. 28, for example.

Here the detector means comprise a pin 180 in two parts: an outside part 181 passing through the cover 108 with friction and surrounding an inside part 182 mounted with friction inside the outside part 181 and with clearance around the cylindrical body 171 of the shouldered screw 170 having the head 172; the outside part 181 projects beyond the inside part 182 on the same side as the pressure plate 101 and the latter projects beyond the outside part 181 on the same side as the head 172; it is therefore the outside part 181 that is adapted to have the pressure plate 101 abut on it through the intermediary of the tongues 115 and the outside part 182 that is adapted to have the head 172 of the screw 172 abut on it, the total length of the pin 180 being slightly less than the axial distance between the facing faces of the tongues 115 and the head 172.

Here the force needed to slide the inside part 182 relative to the outside part 181 is greater than that of the outside part 181 relative to the cover 108, which are of course greater than the return force of the tongues 115 and less than the force of the clutch engaging means.

Figure 32:
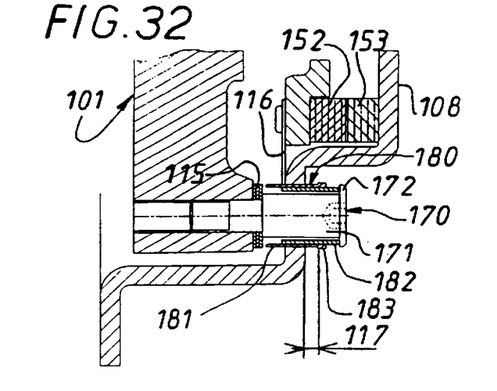
FIGS. 32 to 35 are analogous to FIG. 29 and show a variant of the disabling means adapted to operate on the detector means, the clutch being shown in the following respective conditions: engaged, new linings; engaged, linings worn to the extent required at the end of the take-up operation; engaged and released, linings worn beyond the above degree, the wear take-up device being disabled.
Figure 33:
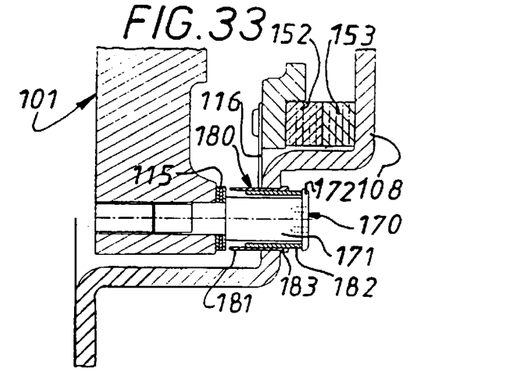
Figure 34:
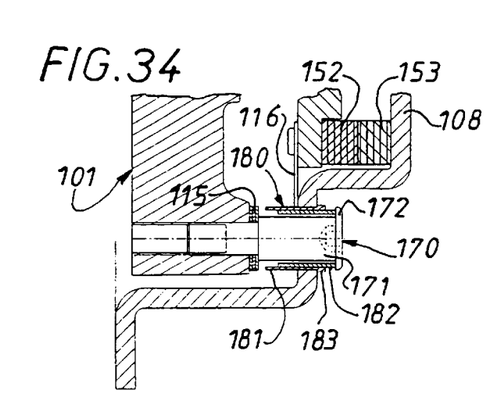
Figure 35:
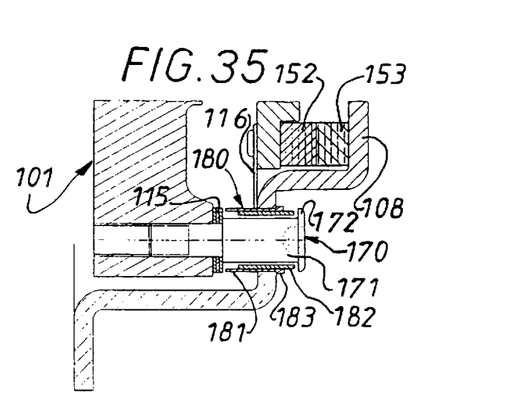

At its end between the cover 108 and the head 172 of the screw 170 the outside part 181 has a rim 183 adapted to abut against the cover 108; the initial positions of the parts and their dimensions are such that in the clutch engaged position with new linings, FIG. 32, a particular length 117 shown in the figure is defined: it corresponds to the worn thicknesses of the linings to be compensated; when the length 117 has been absorbed the rim 183 is abutted against the cover 108, FIG. 33, and the outside part 181 can no longer move relative to the cover 108; the pin 180 no longer serves as detector means; the clutch then operates as usual, without wear take-up, the inside part 182 moving relative to the outside part 181; FIGS. 34 and 35 show this operation without take-up, the clutch being shown engaged in FIG. 34 and released in FIG. 35.

The invention that has just been described with reference to FIGS. 28 to 35 can be applied to a variant clutch of the type described in FIG. 10 of the already mentioned document U.S. Pat. No. 5,564,541.

In this variant the detector means comprise a pin passing through the pressure plate with friction.

In a variant that is not shown a clutch of the kind shown in FIG. 10 of document U.S. Pat. No. 5,564,541 is of the pull type and the support that can be offset is the cover support, the detector means comprising a pin disposed with axial clearance between two abutments, one attached to the reaction plate and the other to the cover, passing through a friction bearing surface of the pressure plate with friction, characterized in that the length of the rubbing bearing surface is less than that of the pin so that the pin is free relative to the pressure plate when the pressure plate is in the clutch released position, with the linings worn to a chosen degree less than the total possible wear.

In another variant that is not shown a clutch of the kind shown in FIG. 10 of document U.S. Pat. No. 5,564,541 is of the pull type and the support that can be offset is the cover support, the detector means comprising a pin disposed with axial clearance between two abutments, one attached to the reaction plate and the other to the cover, and passing through a friction bearing surface of the pressure plate with friction, characterized in that the pin is in two parts, namely an outside part surrounding an inside part, the outside part passing through the pressure plate with friction and the inside part being mounted with friction inside the outside part, the outside part having a rim adapted to abut on the pressure plate so that it is no longer movable relative to the pressure plate and no longer serves as detector means.

Figure 36:
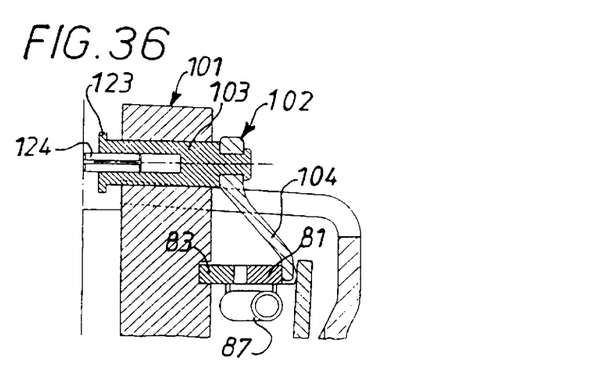
FIG. 36 is a partial view in section of another variant clutch equipped with a wear take-up device comprising a further variant of the disabling means adapted to operate on the detector means which also comprise a pin.

FIG. 36 shows a variant clutch of the type described with reference to FIG. 21; the clutch is of the push type, the clutch engaging means comprise a diaphragm articulated to the cover and the support that can be offset is the pressure plate support; the detector means 102 comprise a pin 103 passing through the pressure plate 101 with friction and carrying an arm 104 cooperating with the ramp means 81 and serving as a take-up control abutment during clutch release; here the pin 103 has a rim 123 at its end between the pressure plate 101, which it projects beyond, and the reaction plate; a rim 123 of the above type abuts against the pressure plate 101 to terminate detection, the clutch then behaving as usual, without take-up; for this usual operation to occur without locking up, the pin 103 being adapted, in order to fulfil its detection role, to abut on the reaction plate, here abuts on the latter through the intermediary of a sliding peg that it carries, the sliding force needed to move the peg 124 relative to the pin 103 being greater than the friction force of the pin 103 relative to the pressure plate 101.

What is claimed is:

1. Friction clutch for motor vehicles, including a reaction plate (202) adapted to be constrained to rotate with a driving shaft, a friction disk (200) carrying at its outside periphery friction linings (201) and adapted to be constrained to rotate with a driven shaft, a pressure plate (1, 51, 101), a cover (2, 52, 108) fixed to the reaction plate (202), axially acting clutch engaging means (3, 53, 150–151) which are operated by clutch release means and which are operative between the cover (2, 52, 108) and the pressure plate (1, 51, 101) through the intermediary of bearing means (14), the pressure plate (1, 51, 101) being constrained to rotate with the cover (2, 52, 108), able to move axially relative to the cover and operated on by return spring means (9) urging the pressure plate (1, 51, 101) axially towards the cover (2, 52, 108), said clutch further including a wear take-up device, one of a number of supports of the clutch engaging means being adapted to be offset axially and the wear take-up device including compensator means actuated by actuator means to cause said one support to be offset axially, said actuator means being operated by trigger means in association with detector means responsive to the wear of the linings and operating on at least one of the actuator means, compensator means and trigger means, characterized in that the wear take-up device further including disabling means for disabling said wear take-up device after a given amount of lining wear of at least 80% regardless of rotational speed, adapted to operate on one of the components of the group comprising the compensator means, the actuator means, the trigger means and the detector means.

2. Friction clutch according to claim 1 characterized in that the compensator means include ramp means (11, 54, 81) disposed circumferentially, placed axially between the bearing means (14) and the pressure plate (1, 51, 101), said ramp means (11, 54, 81) being adapted to cooperate with counter-ramp means (4, 57, 83).

3. Friction clutch according to claim 2 characterized in that the disabling means comprise a heel-piece (85, 86) on at least one of the ramps (82, 84) of the ramp means (81) and the counter-ramp means (83), the heel-piece (85) of the ramp means (81) and the heel-piece (86) of the counter-ramp means (83) being adapted to come into abutting relationship with each other to limit rotation of the ramp means (81) relative to the counter-ramp means (83).

4. Friction clutch according to claim 2 characterized in that the disabling means comprise transverse flats (88, 89) that extend the ramps (82, 84) of the ramp means (81) and the counter-ramp means (83), the transverse flats (88, 89) of the ramp means (81) and the counter-ramp means (83) being adapted to cooperate after a particular relative rotation of the ramp means (81) and the counter-ramp means (83) so that when said transverse flats (88, 89) cooperate with each other further relative rotation does not move the ramp means (81) axially away from the counter-ramp means (83).

5. Friction clutch according to claim 4 wherein the ramp means (81) and the counter-ramp means (83) are caused to rotate relative to each other in the direction that moves them axially away from each other by a tension spring (87) with its ends coupled to each of said means (81, 83), characterized in that the coupling points (90, 91) of said spring (87) are in line with the transverse flats (88, 89) so that when the latter cooperate said spring (87) applies only a low relative rotation torque to the ramp means (81) and the counter-ramp means (83).

6. Friction clutch according to claim 2 wherein the ramp means and the counter-ramp means are rotated relative to each other in the direction that moves them axially apart by a tension spring (87) with its ends coupled to each of said means, characterized in that the spring (87) is a coil spring and the disabling means comprise a rod (92) inside said spring (87) and the length of which is less than the length of the spring (87) in the expanded state corresponding to the initial state with new linings, so that after a particular relative rotation of the ramp means and the counter-ramp means said means are in abutting engagement with each other through the intermediary of said rod (92).

7. Friction clutch according to claim 2 characterized in that the disabling means comprise an abutment (93) carried by the ramp means (81) adapted to cooperate with a counter-abutment (94) to limit rotation of said means (81).

8. Friction clutch according to claim 7 characterized in that the counter-abutment (94) is carried by the counter-ramp means (83).

9. Friction clutch according to claim 7 wherein the counter-ramp means (82) are attached to the pressure plate (101) and characterized in that the counter-abutment (94) is carried by the pressure plate (101) or by a part (104) constrained to rotate with said pressure plate.

10. Friction clutch according to claim 2 characterized in that said wear take-up device comprises teeth (18, 59) with which cooperates a tangential lead screw (13, 63), either the ramp means (11, 54) or the counter-ramp means (4, 57) being attached to said teeth (18, 59), and means (20, 60) being provided for rotating the lead screw (13, 63) and rendered operational by wear of the friction linings when the clutch is engaged.

11. Friction clutch according to claim 10 characterized in that the axially acting clutch engaging means (3, 53) comprise a diaphragm.

12. Friction clutch according to claim 11 characterized in that the lead screw (13, 63) is movable along its axis by take-up spring means (40, 86) and the rotation drive means (20, 60) of the lead screw (13, 63) comprise a ratchet wheel constrained to rotate with the lead screw (13, 63).

13. Friction clutch according to claim 12 characterized in that the rotation drive means (20, 60) of the lead screw (13, 63) are operated by an actuator tongue (35, 76) the travel of which relative to the ratchet wheel (20, 60) during the clutch release operation is limited by a control abutment (36A, 73).

14. Friction clutch according to claim 13 characterized in that the means for disabling the wear take-up device consist in the fact that the length of teeth (18) with which the lead screw (13) cooperates enables it to effect a take-up corresponding to part only of the thickness of the linings that wear.

15. Friction clutch according to claim 14 characterized in that a recess (30) is provided at the end of the teeth (18) to decouple the lead screw (13) from the teeth (18).

16. Friction clutch according to claim 2 wherein the clutch engaging means comprise a diaphragm articulated to the cover between two supports, namely a primary support (110) on the same side as the cover and a secondary support (111) on the same side as the pressure plate (101) and facing the primary support (110), the clutch being of the push type, the support that can be offset being the primary support (110) and triggering being obtained by sinking of the secondary support (111) cooperating with trigger spring means (120) bearing on the cover (108), characterized in that the disabling means comprise an abutment (112, 122) limiting the travel of the trigger spring means (120).

17. Friction clutch according to claim 16 characterized in that the disabling abutment (112) is on the cover (108).

18. Friction clutch according to claim 16 wherein the primary support (110) and the secondary support (111) of the diaphragm are carried by circumferentially distributed columns (109) attached to the cover (108), characterized in that the disabling abutment (122) is on at least one of said columns (109).

19. Friction clutch according to claim 2 wherein the clutch is of the pull type and the support that can be offset is the cover support, the detector means comprising a pin (160) disposed with axial clearance between two abutments (115, 172) attached to the pressure plate (101) and passing through a friction bearing surface (161) of the cover (108) with friction, characterized in that the length of the friction bearing surface (161) is less than that of the pin (160) with the result that the pin (160) is free relative to the cover (108) when the pressure plate (101) is in the clutch disengaged position, the linings being worn by a chosen amount less than the total possible wear.

20. Friction clutch according to claim 2 wherein the clutch is of the pull type and the support that can be offset is the cover support, the detector means comprising a pin (180) disposed with axial clearance between two abutments (115, 172) attached to the pressure plate and passing through a friction bearing surface of the cover (108) with friction, characterized in that the pin (180) is in two parts, namely an outside part (181) surrounding the inside part (182), the outside part (181) passing through the cover (108) with friction and the inside part (182) being mounted with friction inside the outside part (181), the outside part (181) having a rim (183) adapted to abut on the cover (108) so that thereafter it is no longer driven by the pressure plate (101) and no longer serves as detector means.

21. Friction clutch according to claim 2 wherein the clutch is of the pull type and the support that can be offset is the cover support, the detector means comprising a pin disposed with axial clearance between two abutments, one attached to the reaction plate and the other to the other, and passing through a friction bearing surface of the pressure plate with friction, characterized in that the length of the friction bearing surface is less than that of the pin so that the pin is free relative to the pressure plate when the pressure plate is in the clutch released position, the linings having worn by a chosen amount less than the total possible wear.

22. Friction clutch according to claim 2 wherein the clutch is of the pull type and the support that can be offset is the cover support, the detector means comprising a pin disposed with axial clearance between two abutments, one attached to the reaction plate and the other to the cover plate, and passing through a friction bearing area of the pressure plate with friction, characterized in that the pin is in two parts, namely an outside part around an inside part, the outside part passing through the pressure plate with friction and the inside part being mounted with friction inside the outside part, the outside part having a rim adapted to abut on the pressure plate so that thereafter it is no longer movable relative to the pressure plate and no longer serves as detector means.

23. Friction clutch according to claim 22 characterized in that the clutch engaging means comprise clutch release levers (150) associated with coil springs (151) bearing on the cover (108).

24. Friction clutch according to claim 2 wherein the clutch engaging means comprise a diaphragm articulated to the cover, the support which can be offset being the pressure plate support, the clutch being of the push type, the detector means (102) comprising a pin (103) passing through the pressure plate (101) with friction and carrying an arm (104) cooperating with the ramp means (81) to limit rotation thereof on each take-up operation, characterized in that the pin (103) has a rim (123) limiting its movement relative to the pressure plate (101) by said rim (123) abutting on the pressure plate (101) so that it no longer serves as detector means.

25. Friction clutch according to claim 24 characterized in that the pin (103) is adapted to abut against the reaction plate through the intermediary of a sliding pin (124) that it carries, the sliding force being higher than the friction force between the pin (103) and the pressure plate (101).

26. Friction clutch for motor vehicles including a reaction plate (202) adapted to be constrained to rotate with a driving shaft, a friction disk (200) carrying at its outside periphery friction linings (201) and adapted to be constrained to rotate with a driven shaft, a pressure plate (1, 51, 101), a cover (2, 52, 108) fixed to the reaction plate (202), axially acting clutch engaging means (3, 53, 150–151) which are operated by clutch release means and which are operative between the cover (2, 52, 108) and the pressure plate (1, 51, 101) through the intermediary of bearing means (14), the pressure plate (1, 51, 101) being constrained to rotate with the cover (2, 52, 108), able to move axially relative to the cover and operated on by return spring means (9) urging the pressure plate (1, 51, 101) axially towards the cover (2, 52, 108), said clutch further including a wear take-up device, one of a number of supports of the clutch engaging means being adapted to be offset axially and the wear take-up device including compensator means actuated by actuator means to cause said one support to be offset axially, said actuator means being operated by trigger means in association with detector means responsive to the wear of the linings and operating on at least one of the actuator means, compensator means and trigger means, characterized in that the wear take-up device further including disabling means for disabling said wear take-up device before the linings are totally worn, adapted to operate on one of the components of the group comprising the compensator means, the actuator means, the trigger means and the detector means, and characterized in that warning means are provided to indicate disabling of the wear take-up device.

* * * * *